United States Patent
Mir et al.

(10) Patent No.: US 8,638,790 B2
(45) Date of Patent: Jan. 28, 2014

(54) METHOD AND APPARATUS FOR MANAGING DATA SERVICES IN A MULTI-PROCESSOR COMPUTING ENVIRONMENT

(75) Inventors: Idreas Mir, San Diego, CA (US); Jeffrey A. Dyck, San Diego, CA (US); Gerald J. Chambers, Boulder, CO (US); Samson Jim, San Diego, CA (US); Steven J. Doerfler, Erie, CO (US); Marcello Lioy, San Diego, CA (US); Uppinder S. Babbar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 743 days.

(21) Appl. No.: 12/488,104

(22) Filed: Jun. 19, 2009

(65) Prior Publication Data

US 2010/0014459 A1   Jan. 21, 2010

Related U.S. Application Data

(60) Provisional application No. 61/074,825, filed on Jun. 23, 2008.

(51) Int. Cl.
*H04L 12/28* (2006.01)
*H04J 3/24* (2006.01)

(52) U.S. Cl.
USPC .......................................... 370/392; 370/475

(58) Field of Classification Search
None
See application file for complete search history.

(56) References Cited

U.S. PATENT DOCUMENTS

| | | | |
|---|---|---|---|
| 6,801,528 B2 | 10/2004 | Nassar | |
| 7,295,532 B2 | 11/2007 | Haller et al. | |
| 7,317,708 B2 | 1/2008 | Moon et al. | |
| 2004/0004968 A1* | 1/2004 | Nassar | 370/401 |
| 2006/0079280 A1* | 4/2006 | LaPerch | 455/557 |

(Continued)

FOREIGN PATENT DOCUMENTS

| | | |
|---|---|---|
| JP | 2001510947 A | 8/2001 |
| JP | 2006261867 A | 9/2006 |
| JP | 2008060763 A | 3/2008 |
| WO | WO9903044 A2 | 1/1999 |

OTHER PUBLICATIONS

International Search Report & Written Opinion—PCT/US2009/048215, International Search Authority—European Patent Office—Nov. 27, 2009.

(Continued)

*Primary Examiner* — Eunsook Choi
(74) *Attorney, Agent, or Firm* — Charles E. Eggers

(57) ABSTRACT

Systems and methodologies are described that facilitate enhanced data service functionality for data services operating in a multi-processor computing environment. As described herein, respective processors and/or other components can be utilized to form a Smart Peripheral Subsystem (SPS). As further described herein, the SPS can operate in association with a modem processor and an application processor at a mobile computing device in order to reduce loading at the application processor and improve memory usage efficiency. In the case of a mobile computing device sharing a network connection with a tethered computing device, the SPS can couple a modem interface associated with the mobile computing device and an interface through which the disparate computing device is tethered to the mobile computing device such that operations such as Layer 2 (L2) framing and/or de-framing, Network Address Translation (NAT), or the like can be offloaded to the SPS under various circumstances.

51 Claims, 12 Drawing Sheets

(56) References Cited

U.S. PATENT DOCUMENTS

| | | | |
|---|---|---|---|
| 2006/0095587 A1* | 5/2006 | Bhattacharya et al. | 709/245 |
| 2006/0245384 A1* | 11/2006 | Talukdar et al. | 370/310 |
| 2006/0274789 A1* | 12/2006 | Pong | 370/469 |
| 2007/0217408 A1* | 9/2007 | Sahashi et al. | 370/389 |
| 2007/0248085 A1* | 10/2007 | Volpano | 370/389 |
| 2007/0255784 A1* | 11/2007 | Takechi et al. | 709/203 |
| 2008/0040306 A1* | 2/2008 | Ma | 707/1 |
| 2008/0172482 A1* | 7/2008 | Shah | 709/223 |
| 2008/0247399 A1* | 10/2008 | Hazard | 370/395.31 |
| 2009/0092136 A1* | 4/2009 | Nazareth et al. | 370/392 |

OTHER PUBLICATIONS

Kohler E et al: "Modular components for network address translation" Open Architectures and Network Programming Proceedings, 2002 IEEE Jun. 28-29, 2002, Piscataway, NJ, USA,IEEE, Jun. 28, 2002, pp. 39-50, XP010593756 ISBN: 978-0-7803-7457-7, Section 1, Section 2.2, Section 3, Section 3.1, Section 3.2, Section 4.4, figures 1,5.

Srisuresh Kuokoa Networks J Kuthan GMD Fokus J Rosenberg Dynamicsoft A Molitor Aravox Technologies A Rayhan Consultant P: "Middlebox communication architecture and framework;draft-ietf-micom-framework-07.txt" IETF Standard-Working-Draft, Internet Engineering Task Force, IETF, CH, vol. midcom, No. 7, Feb. 28, 2002, XP015022916 ISSN: 0000-0004, Section 1, Section 2.6, Section 2.8, Section 2.10, Section 2.14-2.15, Section 3.0, Section 4.0, Section 7.2-7.3.

Taiwan Search Report—TW098121060—TIPO—Nov. 3, 2012.

* cited by examiner

METHOD AND APPARATUS FOR MANAGING DATA SERVICES IN A MULTI-PROCESSOR COMPUTING ENVIRONMENT

CROSS-REFERENCE

This application claims the benefit of U.S. Provisional Application Ser. No. 61/074,825, filed Jun. 23, 2008, and entitled "PROVIDING DATA SERVICES FOR AN EMBEDDED APPLICATIONS AND INTERNET CONNECTION SHARING (ICS) IN A MULTI-PROCESSOR HIGHER LEVEL OS ENVIRONMENT," the entirety of which is incorporated herein by reference.

BACKGROUND

I. Field

The present disclosure relates generally to mobile computing, and more specifically to techniques for managing a shared network connection between one or more computing devices.

II. Background

Conventionally, dual-processor and/or other multi-processor environments for a mobile computing device (e.g., a personal digital assistant (PDA), smartphone, handheld computer, etc.) can include a modem processor responsible for air interface protocol operations and an application processor that runs the operating system of the device. Further, respective processors in such an environment can connect to peripherals and/or an external memory, which can be partitioned into three regions that correspond to the modem processor, the application processor, and inter-processor communication, respectively.

In order to accomplish various computing tasks, respective processors in a multi-processor mobile computing environment and/or memory regions with which the processors are associated can be configured to interact with each other. Thus, for example, an application running on a mobile computing device using an application processor can utilize wireless data connectivity provided by a modem processor. As another example, a mobile computing device can utilize data service sharing with another computing device that is connected or tethered to the mobile device via one or more interfaces. In such an example, the mobile computing device and the tethered device can utilize a common internet protocol (IP) address on the wireless data connection of the mobile device. Accordingly, the mobile device can be required to monitor uplink and downlink packet flows and perform network address translation (NAT) to direct appropriate data to the tethered device. Traditionally, such operations are performed at the mobile device by an application processor, such that all data packets have to be transferred to and from a modem memory region to an application memory region.

In light of the above examples, it can be appreciated that in both the embedded application case and the data service sharing case, a significant number of data copies are required between the modem and application processors of a mobile device for data processing and/or transfer. These data copies can generate excessive transactions on the system bus and external memory of a mobile device, increasing power consumption and CPU resource usage as well as increasing end-to-end delay. Accordingly, it would be desirable to implement multi-processor management techniques for a mobile computing device that mitigate at least the above shortcomings.

SUMMARY

The following presents a simplified summary of various aspects of the claimed subject matter in order to provide a basic understanding of such aspects. This summary is not an extensive overview of all contemplated aspects, and is intended to neither identify key or critical elements nor delineate the scope of such aspects. Its sole purpose is to present some concepts of the disclosed aspects in a simplified form as a prelude to the more detailed description that is presented later.

According to an aspect, a method is described herein. The method can comprise receiving one or more Network Address Translation (NAT) rules from an application processor; obtaining a packet on a coupled interface; attempting identification of a NAT rule received from the application processor that corresponds to the obtained packet; upon a successful identification attempt, translating the obtained packet according to an identified NAT rule and forwarding the translated packet to one or more translated packet destinations; and upon an unsuccessful identification attempt, forwarding the obtained packet to one or more packet processing destinations.

A second aspect relates to a mobile computing apparatus, which can comprise a memory that stores data relating to one or more NAT rules provided by an application processor. The mobile computing apparatus can further comprise at least one processor coupled to the memory that is disparate from the application processor, the at least one processor configured to receive a packet on a coupled interface, to attempt identification of a NAT rule corresponding to the received packet, to translate the received packet according to an identified NAT rule and forward the translated packet to at least one translated packet destination upon successful identification of a NAT rule, and to forward the received packet to at least one packet processing destination upon unsuccessful identification of a NAT rule.

According to a third aspect, an apparatus is described herein. The apparatus can comprise means for receiving respective NAT mapping rules from an associated application processor; means for identifying a packet obtained via an interface; means for attempting matching of the identified packet to a received NAT mapping rule; means for translating the identified packet according to a matching NAT mapping rule upon successful attempted matching; means for directing the translated packet to one or more translated packet destinations upon application of the matching NAT mapping rule; and means for directing the identified packet to one or more packet processing destinations upon unsuccessful attempted matching.

A fourth aspect described herein relates to an integrated circuit that executes machine-executable instructions. The instructions can comprise receiving respective NAT mapping rules from an associated application processor; identifying a packet obtained via an interface; attempting matching of the identified packet to respective NAT mapping rules; translating the identified packet according to a matching NAT mapping rule upon successful attempted matching; directing the translated packet to one or more translated packet destinations upon application of a matching NAT mapping rule; and directing the identified packet to one or more packet processing destinations upon unsuccessful attempted matching.

To the accomplishment of the foregoing and related ends, one or more aspects of the claimed subject matter comprise the features hereinafter fully described and particularly pointed out in the claims. The following description and the annexed drawings set forth in detail certain illustrative aspects of the claimed subject matter. These aspects are indicative, however, of but a few of the various ways in which the principles of the claimed subject matter can be employed. Further, the disclosed aspects are intended to include all such aspects and their equivalents.

DETAILED DESCRIPTION

Figure 1:
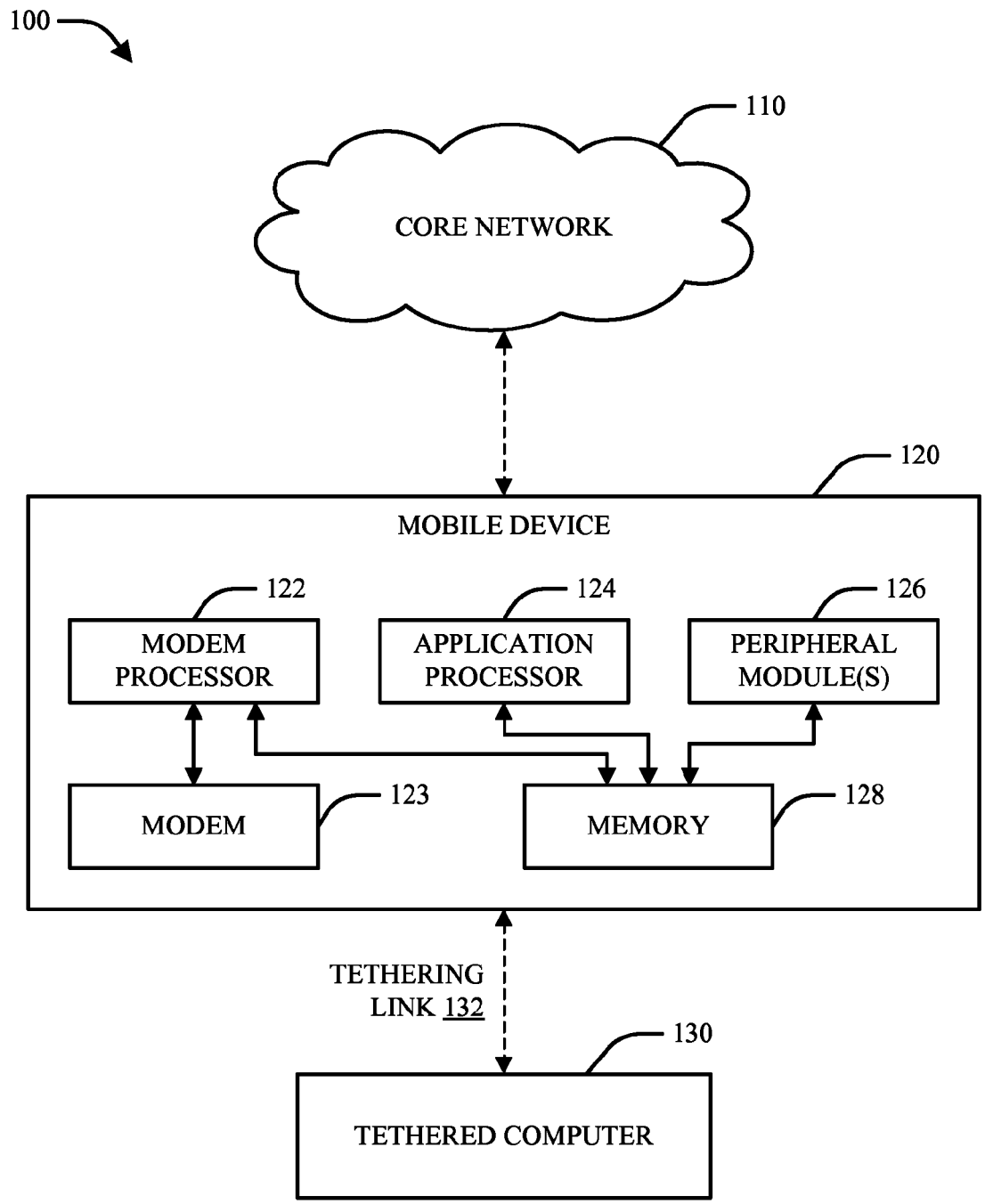
FIG. 1 is a block diagram of a system that facilitates efficient memory management in a multi-processor mobile computing environment in accordance with various aspects.

Various aspects of the claimed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

As used in this application, the terms "component," "module," "system," and the like are intended to refer to a computer-related entity, either hardware, firmware, a combination of hardware and software, software, or software in execution. For example, a component can be, but is not limited to being, a process running on a processor, an integrated circuit, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a wireless terminal and/or a base station. A wireless terminal can refer to a device providing voice and/or data connectivity to a user. A wireless terminal can be connected to a computing device such as a laptop computer or desktop computer, or it can be a self contained device such as a personal digital assistant (PDA). A wireless terminal can also be called a system, a subscriber unit, a subscriber station, mobile station, mobile, remote station, access point, remote terminal, access terminal, user terminal, user agent, user device, or user equipment (UE). A wireless terminal can be a subscriber station, wireless device, cellular telephone, PCS telephone, cordless telephone, a Session Initiation Protocol (SIP) phone, a wireless local loop (WLL) station, a personal digital assistant (PDA), a handheld device having wireless connection capability, or other processing device connected to a wireless modem. A base station (e.g., access point or Evolved Node B (eNB)) can refer to a device in an access network that communicates over the air-interface, through one or more sectors, with wireless terminals. The base station can act as a router between the wireless terminal and the rest of the access network, which can include an Internet Protocol (IP) network, by converting received air-interface frames to IP packets. The base station also coordinates management of attributes for the air interface.

Moreover, various functions described herein can be implemented in hardware, software, firmware, or any combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc (BD), where disks usually reproduce data magnetically and discs reproduce data optically with lasers. Combinations of the above should also be included within the scope of computer-readable media.

Various techniques described herein can be used for various wireless communication systems, such as Code Division Multiple Access (CDMA) systems, Time Division Multiple Access (TDMA) systems, Frequency Division Multiple Access (FDMA) systems, Orthogonal Frequency Division Multiple Access (OFDMA) systems, Single Carrier FDMA (SC-FDMA) systems, and other such systems. The terms "system" and "network" are often used herein interchangeably. A CDMA system can implement a radio technology such as Universal Terrestrial Radio Access (UTRA), CDMA2000, etc. UTRA includes Wideband-CDMA (W-CDMA) and other variants of CDMA. Additionally, CDMA2000 covers the IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is an upcoming release that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Further, CDMA2000 and UMB are described in documents from an organization named "3rd Generation Partnership Project 2" (3GPP2).

Various aspects will be presented in terms of systems that can include a number of devices, components, modules, and the like. It is to be understood and appreciated that the various systems can include additional devices, components, modules, etc. and/or can not include all of the devices, components, modules etc. discussed in connection with the figures. A combination of these approaches can also be used.

Referring now to the drawings, FIG. 1 illustrates a system 100 that facilitates efficient memory management in a multi-processor mobile computing environment in accordance with various aspects described herein. In accordance with one aspect, system 100 can include a mobile device 120, which can utilize an operating system (OS) such as BREW (Binary Runtime Environment for Wireless), Linux, Windows Mobile, or the like, to provide various communication and/or computing services. In one example, mobile device 120 can be constructed as a multi-processor device. More particularly, mobile device 120 can include a modem processor 122 that manages air interface protocol operations (e.g. by controlling a modem 123 and/or one or more other suitable components) with respect to communication with a core network 110. Core network 110 can be, for example, a computing network or internetwork (e.g., the Internet), a wireless or cellular communication network utilizing any suitable wireless communication technology or combination thereof (e.g., UTRA, E-UTRA, UMTS, LTE, GSM, CDMA2000, UMB, Wi-Fi, WiMAX, etc.), or the like. In addition, mobile device 120 can include an application processor 124 (also referred to herein as an "apps processor") that manages the operating system of mobile device 120 and/or respective applications running thereon.

In another example, modem processor 122 and application processor 124 can be connected to a shared memory 128. By way of specific example, memory 128 can be partitioned into three regions, which can respectively correspond to modem processor 122, application processor 124, and inter-processor communication between processors 122 and 124 and/or other processors utilized by mobile device 120. Additionally and/or alternatively, modem processor 122 and/or application processor 124 can be connected to one or more peripherals (not shown) via SDIO (secure digital input/output), Universal Serial Bus (USB), Bluetooth (BT), UART (universal asynchronous receiver/transmitter), and/or any other peripheral interface(s).

In accordance with one aspect, modem processor 122 and application processor 124 can cooperate to provide various services. As a first example, mobile device 120 can execute one or more embedded applications that utilize the wireless data connectivity provided by modem 123 for network-based or internet-based services. In such an example, modem 123 can process the air interface protocol and write respective packets associated with a downlink data flow to the modem region of memory 128. Next, the respective packets can be copied to the shared region of memory 128, where they can subsequently be copied by application processor 124 to the application region of memory 128. Thus, it can be appreciated that at least three data movements can be required to process and transfer data packets between modem processor 122 and application processor 124 in the above example. Alternatively, a first region of memory 128 can be configured as readable and writable by modem processor 122 and readable only by application processor 124 for the downlink data path and/or vice versa. However, it can be appreciated that such a configuration can also require data copies or movements within memory 128. By way of example, the downlink data path in such a configuration can require a first data movement from modem 123 to the modem region of memory 128 and a second data movement from the modem region of memory 128 to the application region of memory 128.

As a second example, mobile device 120 can run one or more embedded applications in cooperation with a tethered computer 130 that is associated with mobile device 120 via a tethering link 132. Tethered computer 130 can be any suitable computing device, such as a personal computer (PC), a laptop or tablet computer, a PDA, a smartphone, or the like. Further, a tethering link 132 utilized to connect tethered computer 130 to mobile device 120 can be a USB, Firewire, Wi-Fi, Bluetooth, and/or any other suitable interface(s). In such an example, mobile device 120 and tethered computer 130 can have disparate internal or private Internet Protocol (IP) addresses such that mobile device 120 can distinguish IP data flows directed to mobile device 120 and/or tethered computer 130 and forward corresponding packets accordingly. Additionally or alternatively, mobile device 120 and tethered computer 130 can share a common public IP address and/or other network address on the wireless data connection. In such an example, mobile device 120 can be configured to monitor uplink packet flows and translate internal addresses and/or ports to the appropriate outgoing addresses and/or ports, or vice versa, based on one or more network address translation (NAT) operations. Such operations are described in further detail infra.

In one example, NAT operations are performed by mobile device 120 using application processor 124 such that substantially all data packets are required to be transferred from the modem region of memory 128 to the application region of memory 128. Thus, in a similar manner to the embedded application scenario described above, it can be appreciated that at least three data copies can be required between modem processor 122 and application processor 124 for data processing and transfer associated with a tethering session. More specifically, packets destined to tethered computer 130 can be required to be transferred to application processor 124 on the downlink direction due to the fact that the transport and network protocol layers, as well as NAT operations, are executed by application processor 124. Further, for the uplink direction, it can be appreciated that packets coming from tethered computer 130 can be transferred to application processor 124 at mobile device 120 for protocol layer processing before the packets are forwarded to modem processor 122. Performing excessive data copies in this manner can generate unnecessary transactions on the system bus and the external memory associated with mobile device 120, which can increase power consumption, cost extra processor resources, increase end-to-end delay, and/or negatively affect user experience in one or more other manners.

To mitigate the above inefficiencies associated with conventional shared memory systems and/or other shortcomings, a mobile device 120 in system 100 can, in accordance with various aspects, include one or more peripheral modules 126. In one example, peripheral module(s) 126 can be implemented as hardware, software, and/or other component(s) that are independent of modem processor 122 and application processor 124, thereby facilitating expedited use of an associated memory 128.

In accordance with one aspect, peripheral module(s) 126 can be leveraged by mobile device 120 to substantially reduce processing overhead associated with data movements between modem processor 122 and application processor 124. By way of example, in the case of an embedded application resident on mobile device 120, peripheral module(s) 126 can facilitate interaction between modem processor 122 and application processor 124 requiring only one data copy by reading packets from a modem region of memory 128 and writing to the application region of memory 128 after completion of any associated air interface protocols and/or IP/Transmission Control Protocol (TCP)/User Datagram Protocol (UDP) operations.

As another example, in the case of data service sharing between mobile device 120 and tethered computer 130, peripheral module(s) 126 can move respective packets destined for tethered computer 130 to a tethering link 132 (e.g., USB, Firewire, Bluetooth, etc.) by which mobile device 120 and tethered computer 130 are coupled directly without passing through application processor 124. Accordingly, it can be appreciated that utilizing peripheral module(s) 126 in the manner can result in power savings, increased CPU (Central Processing Unit) resource efficiency, reduced packet latency, and/or other benefits. For example, in an absence of embedded application data, application processor 124 can be configured to fully inactivate for power savings such that only modem processor 122 is required to be active to process data for tethered computer 130.

In a further example, peripheral module(s) 126 can be implemented as one or more dedicated ASICs (application specific integrated circuits) and/or other hardware components, such that operations that are demanding on bus bandwidth, processor resources, or the like (e.g., ciphering, checksum computation, etc.) can be grouped together and implemented in the dedicated peripheral module(s) 126. As a result, data can be read a single time from memory 128, upon which respective operations can be offloaded to a dedicated peripheral module 126 instead of stressing processors 122 and/or 124.

In accordance with one aspect, peripheral module(s) 126 can be configured by modem processor 122 and/or any other suitable component(s) to facilitate one or more operations for network layer (e.g., IP) and/or transport layer (e.g. TCP/UDP) processing, such as IP filtering and packet forwarding, NAT translation, IP/TCP/UDP checksum validation and computation, or the like. Specific examples of these and other operations that can be performed by peripheral module(s) 126 are described in further detail infra.

In accordance with an additional aspect, peripheral module(s) 126 can be configured to have read and write access to sections of memory 128 associated with both modem processor 122 and application processor 124. In one example, security protection for memory 128 can be maintained via a memory protection unit (MPU), which can implement memory access control across modem processor 122, application processor 124, and/or peripheral module(s) 126.

Figure 2:
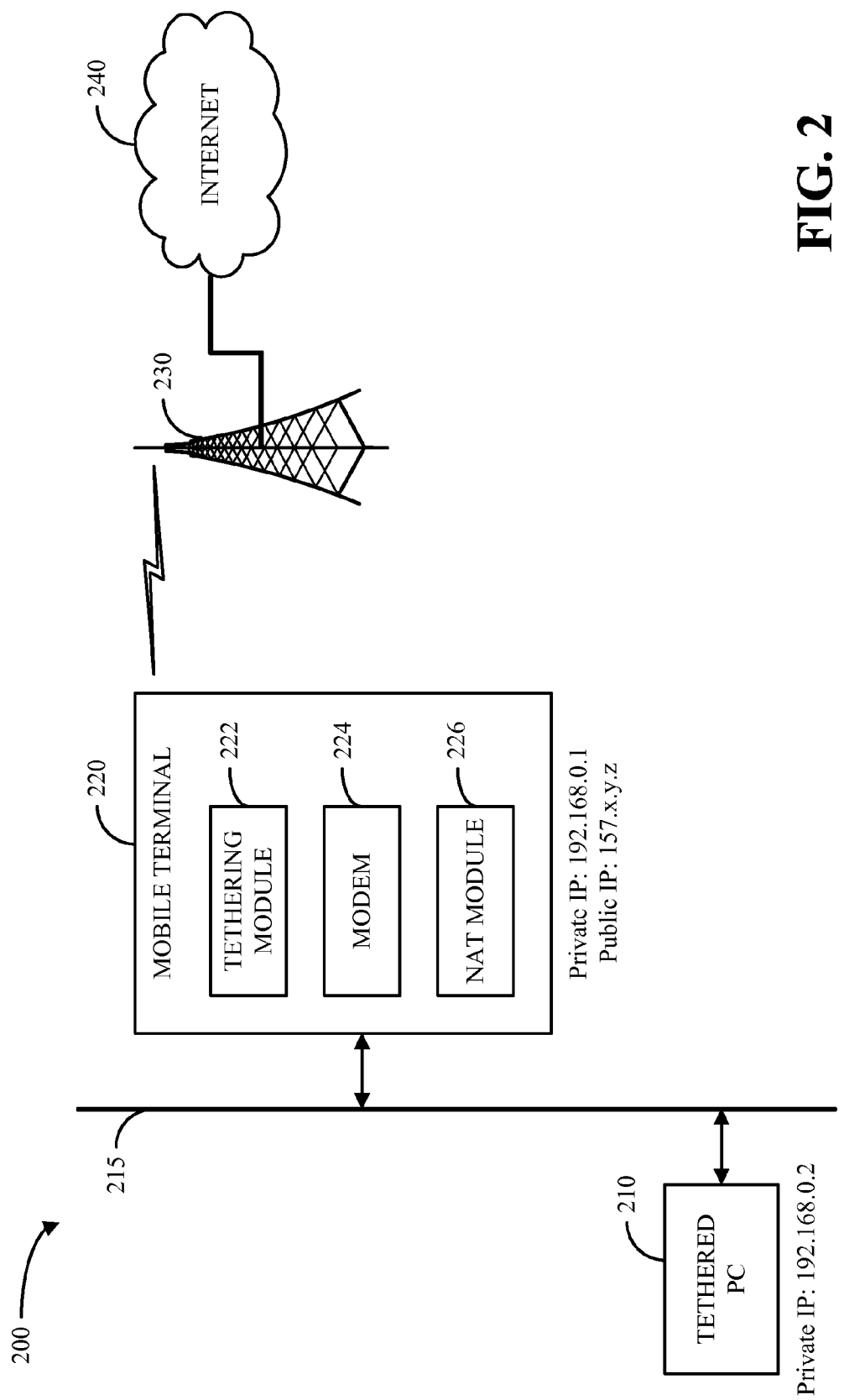
FIG. 2 is a block diagram of an example system for sharing a network interface by way of a Network Address Translation (NAT) function including service to respective local processor(s) and/or tethered processor(s) in accordance with various aspects.

Turning next to FIG. 2, a system 200 is illustrated on which an example tethering and network sharing procedure is conducted between a PC 210 and a mobile terminal 220. It should be appreciated, however, that while system 200 illustrates an example network sharing procedure for a PC and a mobile terminal, any suitable computing devices could utilize tethering and/or network sharing in a similar manner to that illustrated by system 200.

As system 200 illustrates, a mobile terminal 220 having access to the Internet 240 and/or another suitable network or internetwork via a connection to a wireless communication system through a base station 230 and/or another suitable entity can utilize network sharing to share access to Internet 240 with one or more tethered devices 210 (e.g., connected to mobile terminal 220 using USB, Wi-Fi, Bluetooth Personal Area Network (PAN), and/or any other suitable interface) through a private or local network 215. In one example, mobile terminal 220 can utilize a tethering module 222 to coordinate communication to and/or from Internet 240 by all devices associated with local network 215 via a modem 224 and/or another suitable communication device.

In accordance with one aspect, mobile terminal 220 can further include a NAT module 226, which can enable multiple host devices to access a wide area network (WAN) such as Internet 240 using a single network connection defined by a single public IP address. For example, within local network 215, respective associated devices 210-220 can be assigned private IP addresses (e.g., 192.168.0.1, 192.168.0.2, etc.) that identify the respective devices on local network 215, while mobile terminal 220 can utilize a public IP address (e.g., 157.x.y.z, where x, y, and z are integers between 0 and 255, etc.) for communication between local network 215 and Internet 240. Thus, as shown in system 200, NAT module 226 at mobile terminal 220 can enable communication between devices on local network 215 and base station 230 and/or Internet 240 by translating packets from a local {private IP address, port} pair to a WAN {public IP address, port} pair and vice versa. In one example, port translation can be performed in addition to or in place of IP address translation in order to prevent port collisions between devices using local network 215. Additionally or alternatively, NAT module 226 can perform one or more operations on respective packets during translation, such as, for example, performing TCP and/or IP checksum adjustment within headers of respective packets to reflect any applicable IP address and/or port translations performed on the packets. In another example, NAT module 226 can be activated when a tethered data service is provided to one or more devices 210 via tethering module 222.

In accordance with another aspect, mobile terminal 220 can be made NAT aware such that global ports that are in use are not assigned as ephemeral port values for new sockets using the global IP address associated with mobile terminal 220. Similarly, mobile terminal 220 can form NAT mappings such that new NAT mappings avoid public ports that are in use by existing sockets using the global IP address associated with mobile terminal 220.

Figure 3:
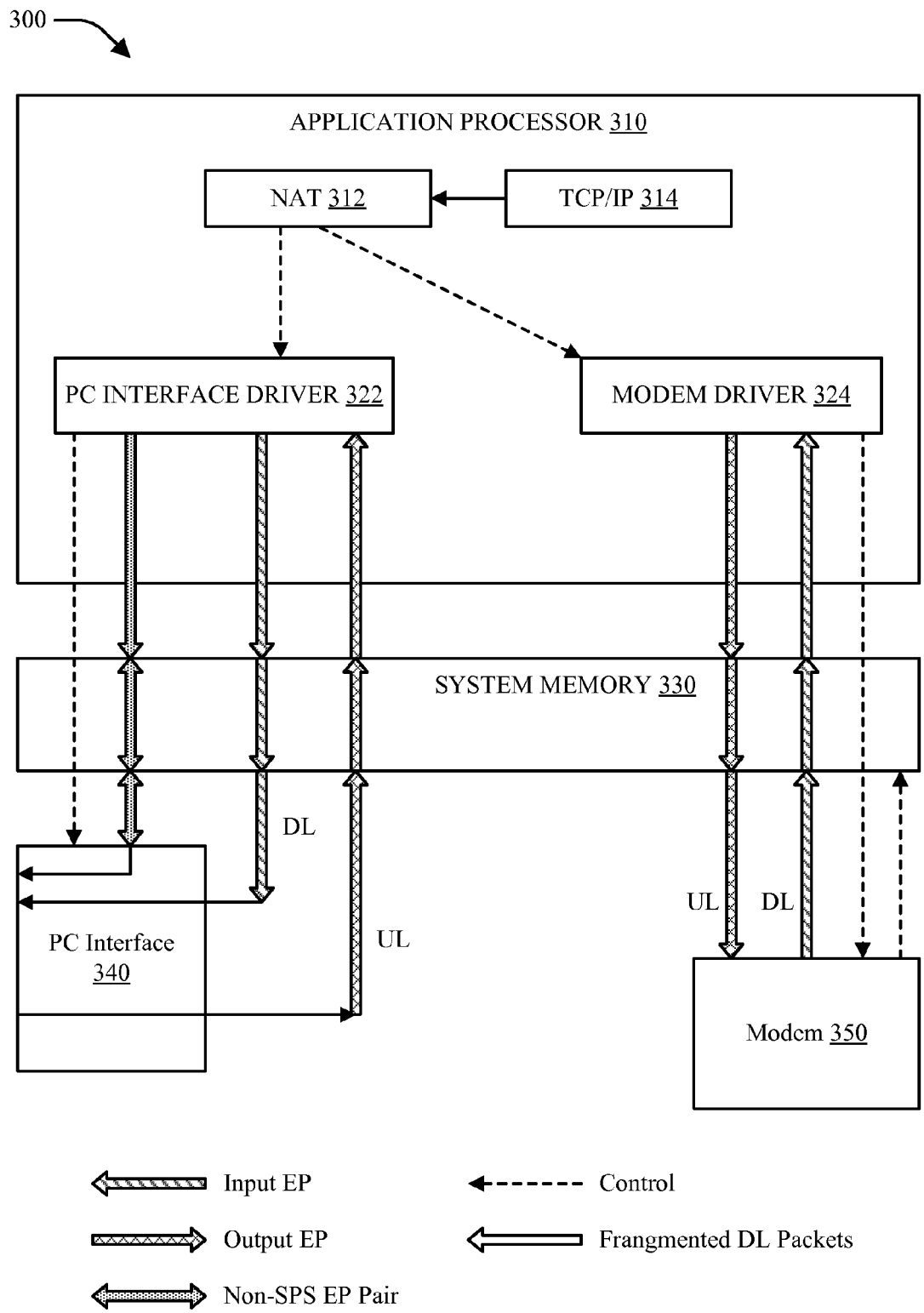
FIG. 3 illustrates an example mobile computing architecture that can be utilized to implement network interface sharing.

In one example, a mobile computing device can manage communication of data and/or control information associated with a network interface sharing arrangement with one or more other devices as shown by system 300 in FIG. 3. While some elements of system 300 as illustrated in FIG. 3 may be associated with various mobile computing implementations, it should be appreciated that the respective elements illustrated within system 300 are provided by way of specific, non-limiting example and that, unless explicitly stated otherwise, the claims are not intended to be limited to any specific implementation or combination thereof.

In one example, system 300 can be implemented by a mobile computing device and/or any other suitable computing device and can include an application processor 310, a PC interface 340, and a modem 350, each of which can respectively share a system memory 330. In accordance with one aspect, PC interface 340 can be utilized to couple one or more computing devices to a device implementing system 300 in association with a network interface sharing operation and/or any other suitable operation(s). PC interface 340 can be implemented via USB, Bluetooth, Firewire, and/or any other suitable interface type(s). In one example, PC interface 340 can be controlled by a PC interface driver 322 associated with application processor 310.

In accordance with another aspect, modem 350 can be utilized to manage communication to and/or from a public communication network associated with system 300. In one example, modem 350 can be controlled by a modem driver 324 associated with application processor 310. Additionally or alternatively, a modem processor, a protocol processing driver, and/or other suitable control mechanism(s) can be provided within and/or in association with modem 350 to facilitate control of modem 350.

In a further example, system 300 can include mechanisms for a tethered data connection between a mobile device associated with system 300 and a PC and/or other suitable computing device. In such an example, application processor 310 can serve as an intermediate node between a modem processor associated with modem 350 and a tethered computing device, such that the tethered device is the source and/or sink of various data and some or all remaining data is sourced and/or sinked at application processor 310. To these ends, application processor 310 can include a NAT module 312, which can allow both application processor 310 and a tethered device to share a common wireless connection through an associated modem processor. In one example, NAT module 312 can be implemented in software at application processor 310. Additionally or alternatively, application processor can further include a TCP/IP module 314 to facilitate packet transport, framing, and/or any other suitable operation(s) required for communication of data between system 300 and an associated public network.

As application processor 310 in system 300 serves as an intermediate node between a tethered computing device and a public network, it can be observed that system 300 is configured to route all packets transmitted to and/or from the public network. These packets can correspond to, for example, Input and/or Output Endpoints (EPs). However, as shown by system 300, even in the case that respective packets destined to and/or from the public network are not consumed by a device implementing system 300, such packets can still be required to be routed through application processor 310 and PC interface 340 for header updates and/or other processing prior to communication of the packets. As a result, it can be appreciated that processing by application processor 310 can be required for substantially all packets coming in or out of an associated public network, which can lead to excessive strain on application processor 310, power usage, and the like.

Figure 4:
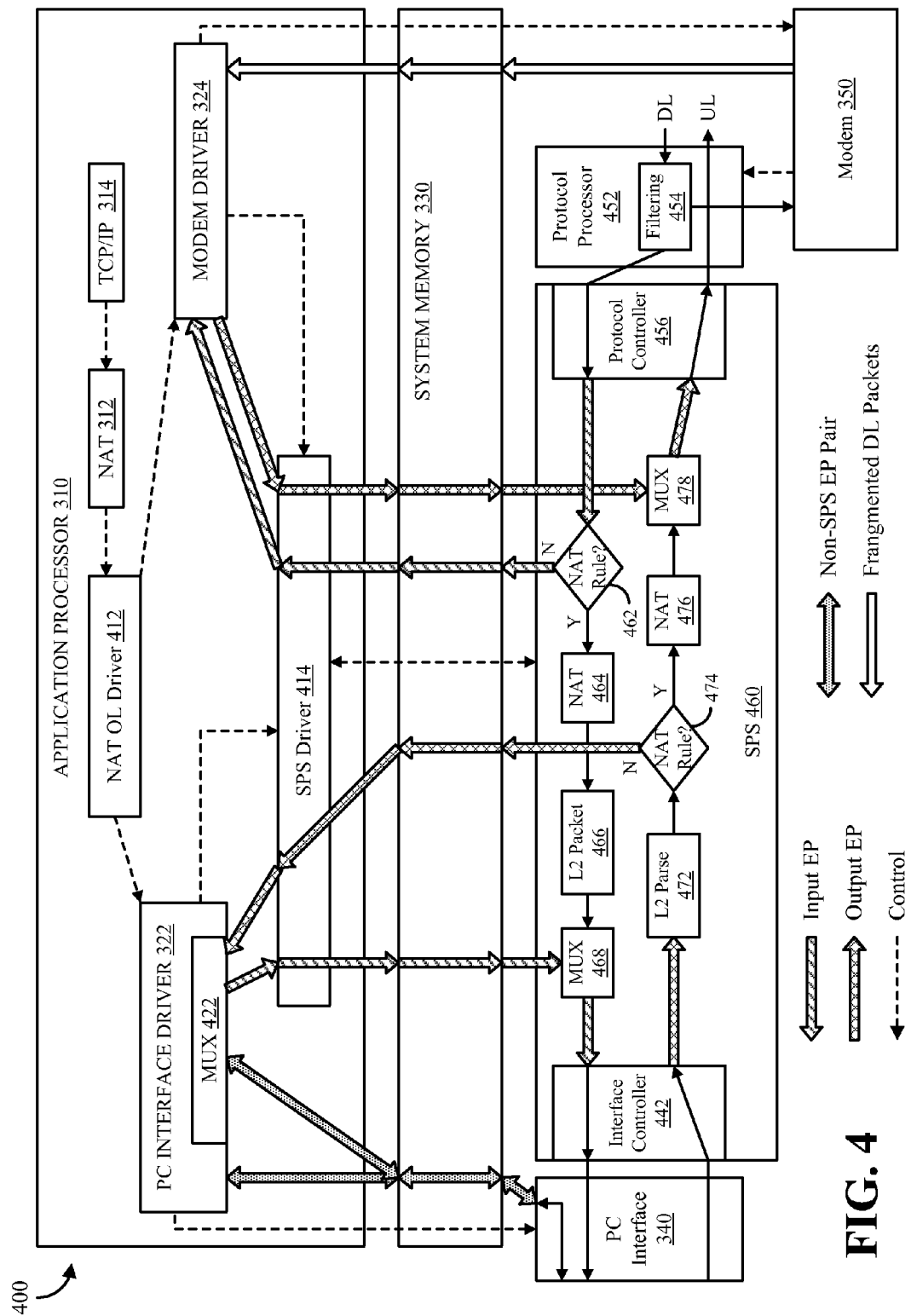
FIG. 4 illustrates an example of a mobile computing architecture that can be utilized to facilitate advanced data service management associated with a network interface sharing session in accordance with various aspects.

Accordingly, to mitigate at least the above described shortcomings, NAT translation and/or other packet processing operations can be offloaded from application processor 310 to one or more disparate modules, as illustrated by system 400 in FIG. 4. In accordance with one aspect illustrated by FIG. 4, system 400 can include a smart peripheral subsystem (SPS) module 460, which can include one or more processors and/or other appropriate component(s) for performing respective operations offloaded from application processor 310.

In one example, SPS 460 can be coupled with a PC interface 340 associated with a tethered computing device (e.g., via an interface controller 442), which can serve as NAT-enabled tethered network connection interface for the tethered computing device. Additionally or alternatively, SPS 460 can be coupled with a protocol processor 452 associated with modem 350 (e.g., via protocol controller 456), a shared system memory 330 accessible to SPS 460 and application processor 310, and/or any other suitable interface(s). Based on these associations, SPS 460 can perform one or more operations for respective packets communicated within a private network associated with system 400. For example, upon detecting a packet, SPS 460 can perform NAT translation for the packet, identify one or more intended destinations of the packet, and route the packet to the corresponding destination adapter(s) with substantially minimal required interaction from application processor 310.

Thus, by way of example, when an uplink (UL) packet arrives on PC interface 340, SPS 460 can analyze the packet and identify whether the packet is intended for a packet processing destination, such as the device associated with application processor 310 or the like, or a translated packet destination, such as a WAN associated with modem 350 or the like. Upon identifying that the packet is intended for one or more translated packet destinations, SPS 460 can perform NAT translation and forward the packet directly to modem 350 and/or any other suitable destination(s) without requiring intervention from application processor 310. Similarly, SPS 460 can perform NAT translation and direct forwarding to PC interface 340 and/or any other suitable translated packet destination for downlink (DL) packets arriving on modem 350 that are identified as destined for a tethered computing device associated with PC interface 340 or the like. By performing NAT translation and forwarding in this manner, it can be appreciated that SPS 460 can provide significant savings in processing power at application processor 310, bus bandwidth associated with inter-processor communication between application processor and SPS 460, and/or other performance criteria.

In accordance with another aspect, SPS 460 can perform NAT translation operations on respective packets based on one or more NAT rules that are provided to SPS 460 by application processor 310. In one example, a set of NAT rules can be configured by a SPS driver 414 as a table of mappings from private IP address/port pairs to public IP address/port pairs or other suitable mappings. In another example, SPS driver 414 can set NAT rules based at least on instructions received from a NAT offload (OL) driver 412.

In accordance with a further aspect, SPS driver can be configured to identify new connections made between applications on a private network associated with system 400 and a public network with which modem 350 is associated. Upon identification of a new connection, NAT OL driver 412 can act in cooperation with or independently of an OS associated with application processor 310 to set up a NAT translation rule for the new connection, which can subsequently be provided to SPS driver 414 to be relayed to SPS 460. Additionally or alternatively, SPS driver 414 can be configured to identify that one or more connections corresponding to respective NAT rules are no longer being utilized, based on which SPS driver 414 can instruct removal of the corresponding NAT rules at SPS 460. In one example, upon removal of a NAT rule at SPS 460, SPS driver 414 can additionally be configured to pass status information to NAT OL driver 412 to indicate that the NAT rule is no longer being handled by SPS 460.

As further illustrated in system 400, SPS 460 can include respective components for processing respective packets in the UL direction and/or the DL direction. In the DL direction, a packet intended for a device connected through PC interface 340 can be initially processed by protocol processor 452, which can perform filtering for the packet using a filtering block 454 and/or any other suitable operation(s) as directed by protocol controller 456. Subsequently, rather than passing the packet to application processor 310 as illustrated in system 300, the packet can be provided to SPS 460.

Upon receipt of the packet at SPS 460, a decision block 462 can determine whether one or more NAT rules configured by SPS driver 414 match a connection specified by the packet (e.g. as specified by a public IP address and/or port). If a matching rule is identified, NAT translation can be performed for the packet at NAT block 464 using the identified rule. Additionally or alternatively, Open Systems Interconnection (OSI) Layer 2 (L2) or link layer framing can be performed for the packet at L2 Packet block 466 and/or another suitable module. Otherwise, if a matching NAT rule is not discovered, decision block 462 can instead pass the packet to application processor 310 for processing. Subsequent to processing, SPS driver 414 and/or one or more other components associated with application processor 310 can optionally create a new NAT rule corresponding to the packet and facilitate installation of the created rule at SPS 460. Based on the action taken by decision block 462, a multiplexer (MUX) 468 can be utilized to pass the processed packet from the location at which processing was performed to PC interface 340 for forwarding on to the appropriate device.

Similarly, in the UL direction, a packet intended for a public network associated with modem 350 that is received at PC interface 340 can be provided to SPS 460. Upon arrival at SPS 460, L2 de-framing or parsing can be performed for the packet by L2 Parse block 472 and/or another suitable module, following which the packet can be routed through SPS 460 using a decision block 474, NAT block 476, and multiplexer 478 in a similar manner to that described above regarding decision block 462, NAT block 464, and multiplexer 468. The processed UL packet can subsequently be provided to protocol processor 452, from which the packet can be communicated by modem 350 to an associated public network.

In accordance with one aspect, SPS 460 can utilize one or more L2 Packet blocks 466, L2 Parse blocks 472, and/or any other suitable module(s) for conducting L2 framing and/or de-framing for respective packets processed by SPS 460. In one example, L2 Packet block 466, L2 Parse block 472, and/or other similar blocks can be utilized to facilitate interoperability between link layer protocols associated with a network with which modem 350 communicates (e.g., a network utilizing CDMA, UMTS, WLAN, Bluetooth, etc.) and a tethering link corresponding to PC interface 340 (e.g., USB, Firewire, Wi-Fi, etc.) and higher-level network and transport layer protocols (e.g., OSI Layer 3 (L3) and/or Layer 4 (L4) protocols) associated with NAT translation.

Thus, in one example, L2 Parse block 472 can be utilized to perform L2 de-framing for respective packets received from PC interface 340 in order to enable various processing operations (e.g., NAT translation, TCP/IP checksum validation and computation, etc.) on network layer and/or transport layer information contained in the packets. Similarly, L2 Packet block 466 can be utilized to perform L2 framing on packets processed by blocks 462-464 or the like in order to facilitate use of the respective packets according to one or more link layer protocols associated with PC interface 340. By performing packet parsing and/or encapsulation in this manner, it can be appreciated that substantially all functions related to processing of respective packets that correspond to known NAT relationships within 400 can be offloaded to SPS 460, thereby enabling system 400 to achieve high data rates without incurring expense at application processor 310.

Additionally or alternatively, while not shown in system 400, OSI Layer 2 or link layer framing and de-framing could both be performed for uplink and/or downlink packets within SPS 460 by, for example, utilizing a L2 Parse block prior to decision block 462 and/or a L2 Packet block prior to multiplexer 478. It can be appreciated that this could be done to enable expedited packet processing via SPS 460 for a system that utilizes heterogeneous L2 protocols at PC interface 340 and modem 350. Thus, for example, a packet arriving at SPS 460 on the uplink or downlink can be de-framed at the link layer according to a first link layer protocol, processed on a network and/or transport layer level, and subsequently re-framed at the link layer according to a second, disparate link layer protocol.

In accordance with another aspect, system 400 can elect to pass respective packets to application processor 310 for processing instead of, or in addition to, offloading processing to SPS 460 based on various criteria. For example, system 400 illustrates that fragmented packets received by modem 350 on the downlink can be provided to modem driver 324 at application processor 310 for reassembly. Following reassembly, NAT translation and/or other operations on respective reassembled packets can be performed by application processor 310, or alternatively modem driver 324 can offload the reassembled packets to SPS 460 for further processing.

As further illustrated by system 400, respective packets originating at PC interface 340 and/or application processor 310 can additionally or alternatively be routed between application processor 310 and PC interface 340 without intervention from SPS 460. Packets routed through application processor 310 can include, for example, packets corresponding to endpoints that are not related to SPS 460 or the NAT offload interface, such as control endpoints, endpoints associated with an interface disparate from the NAT offload interface (e.g., a Diagnostic (Diag) interface, a National Marine Electronics Association (NMEA) interface, etc.), or the like; packets corresponding to endpoints used for a NAT offload interface in the event that an application running on application processor 310 is communicating with an application running on a device associated with PC interface 340 without involvement of modem 350; and/or any other suitable packet(s). In one example, upon forwarding of packets from PC interface 340 to application processor 310, the forwarded packets can be processed by PC interface driver 322, after which a multiplexer 422 and/or other suitable means can be utilized to selectively provide the processed packets back to PC interface 340 and/or to SPS 460 for further processing.

With regard to the above examples, it should be appreciated that fragmented packets, packets directly communicated between PC interface 340 and PC interface driver 322 as shown in system 400, and/or any other packets communicated within system 400 need not be provided directly to application processor 310. Alternatively, it can be appreciated that such packets could be provided to SPS 460 to facilitate some or all processing described above with regard to application processor 310.

Figure 5:
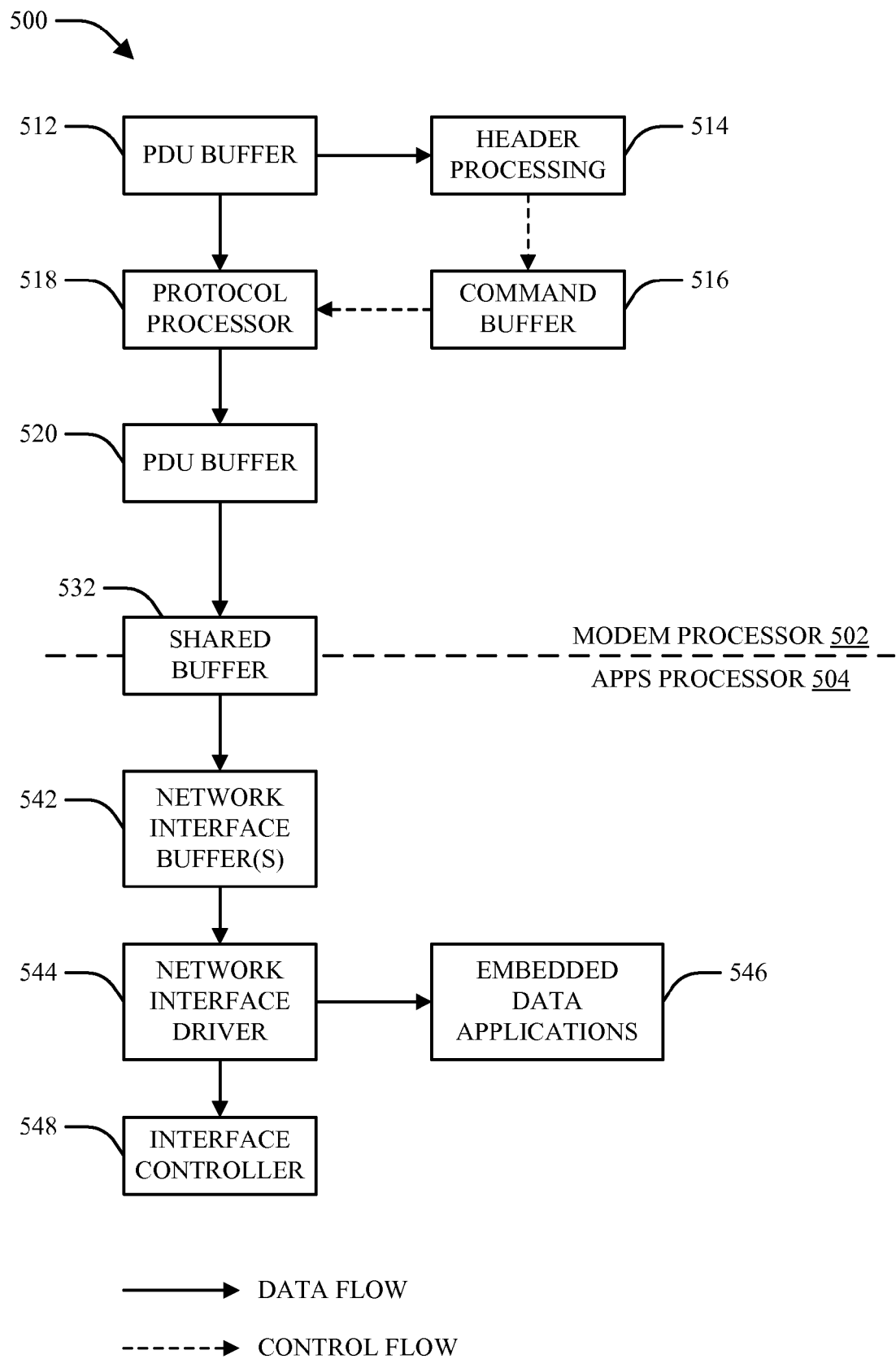
FIGS. 5-6 illustrate information flows associated with a network interface sharing session conducted by respective example multi-processor mobile computing implementations in accordance with various aspects.
Figure 6:
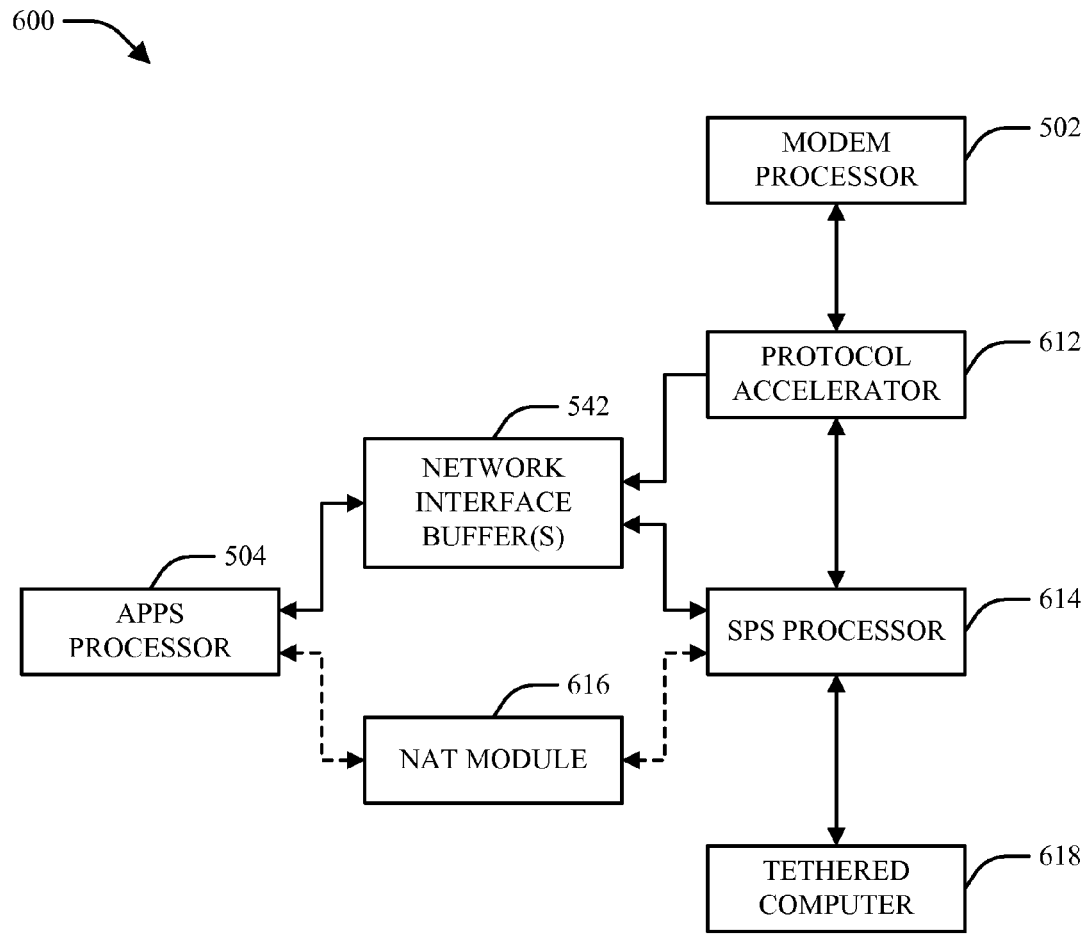

With reference next to FIGS. 5-6, respective diagrams 500-600 are provided that illustrate example flows of information between a modem processor 502 and an apps processor 504 that can be associated with a mobile computing device in accordance with various aspects. Turning first to system 500 in FIG. 5, respective Protocol Data Units (PDUs) located at a first PDU buffer 512 associated with modem processor 502 can be passed to a header processing block 514, which can generate control information corresponding to the PDUs and submit generated control information to a protocol processor 518 in combination with the corresponding PDUs from PDU buffer 512. Upon receiving respective PDUs, protocol processor 518 can perform one or more processing operations on the PDUs, such as Cyclic Redundancy Check (CRC) validation, deciphering, or the like. Protocol processor can then provide the processed PDUs to a second PDU buffer 520, which in turn can forward the PDUs to a shared buffer 532 that is common to modem processor 502 and apps processor 504.

Upon arrival of respective PDUs at shared buffer 532, apps processor 504 can read the PDUs to one or more network interface buffers 542, which can in turn forward the PDUs to a network interface driver 544. In one example, network interface driver 544 can submit packets destined for the device associated with system 500 to one or more embedded data applications 546 resident on apps processor 504. Additionally or alternatively, network interface driver 544 can provide one or more packets destined for a tethered computer device to an interface controller 548 (e.g., a USB controller, a Bluetooth controller, etc.) coupled to the tethered computer device.

As illustrated by system 500, in order to facilitate a movement of data between modem processor 502 and apps processor 504, three data movements are required—from protocol processor 518 to PDU buffer 520, from PDU buffer 520 to shared buffer 532, and from shared buffer 532 to network interface buffer(s) 542. In addition, for a transfer of data between modem processor 502 and a tethered computer device, it can be appreciated that a fourth data movement can be required between network interface buffer(s) 542 and interface controller 548 via network interface driver 544.

In view of the above, in accordance with one aspect, system 600 as illustrated in FIG. 6 can be implemented to increase memory access efficiency, reduce loading of apps processor 504, and/or to provide other benefits. As system 600 illustrates, modem processor 502 can provide respective PDUs to a protocol accelerator 612, which can attempt to match received PDUs to static downlink NAT mappings. In one example, PDUs that do not match static mappings known to protocol accelerator 612 can be passed to one or network interface buffers 542, which in turn can forward the PDUs to apps processor 504 for further processing. Apps processor 504 can subsequently provide control information corresponding to the PDUs to a NAT module 616, which can configure one or more new NAT mappings based on the control information and forward the configured NAT mappings to a SPS processor 614. Additionally or alternatively, respective PDUs for which static address/port mappings are found can be passed to SPS processor 614, which can forward the PDUs to a tethered computer 618 through a corresponding tethering link. In one example, SPS processor 614 can further perform de-framing based on one or more link layer protocols (e.g., IEEE 802.3, IEEE 802.11, etc.), modification and/or addition of port or checksum information, and/or any other suitable operations on respective PDUs. In another example, SPS processor 614 can forward information related to NAT mappings no longer utilized, PDUs that do not match any known static NAT mappings, or the like to NAT module 616 for forwarding to apps processor 504.

Accordingly, it can be appreciated that, for PDUs for which a DL mapping is present at protocol accelerator 612 and/or SPS processor 614, a transfer from a modem processor 502 to a tethered computer 618 can be performed with fewer required memory accesses than that required by system 500. Further, it can be observed that substantially no operations are required by apps processor 504 in such a case, thereby increasing the overall efficiency of apps processor 504 and system 600.

Figure 7:
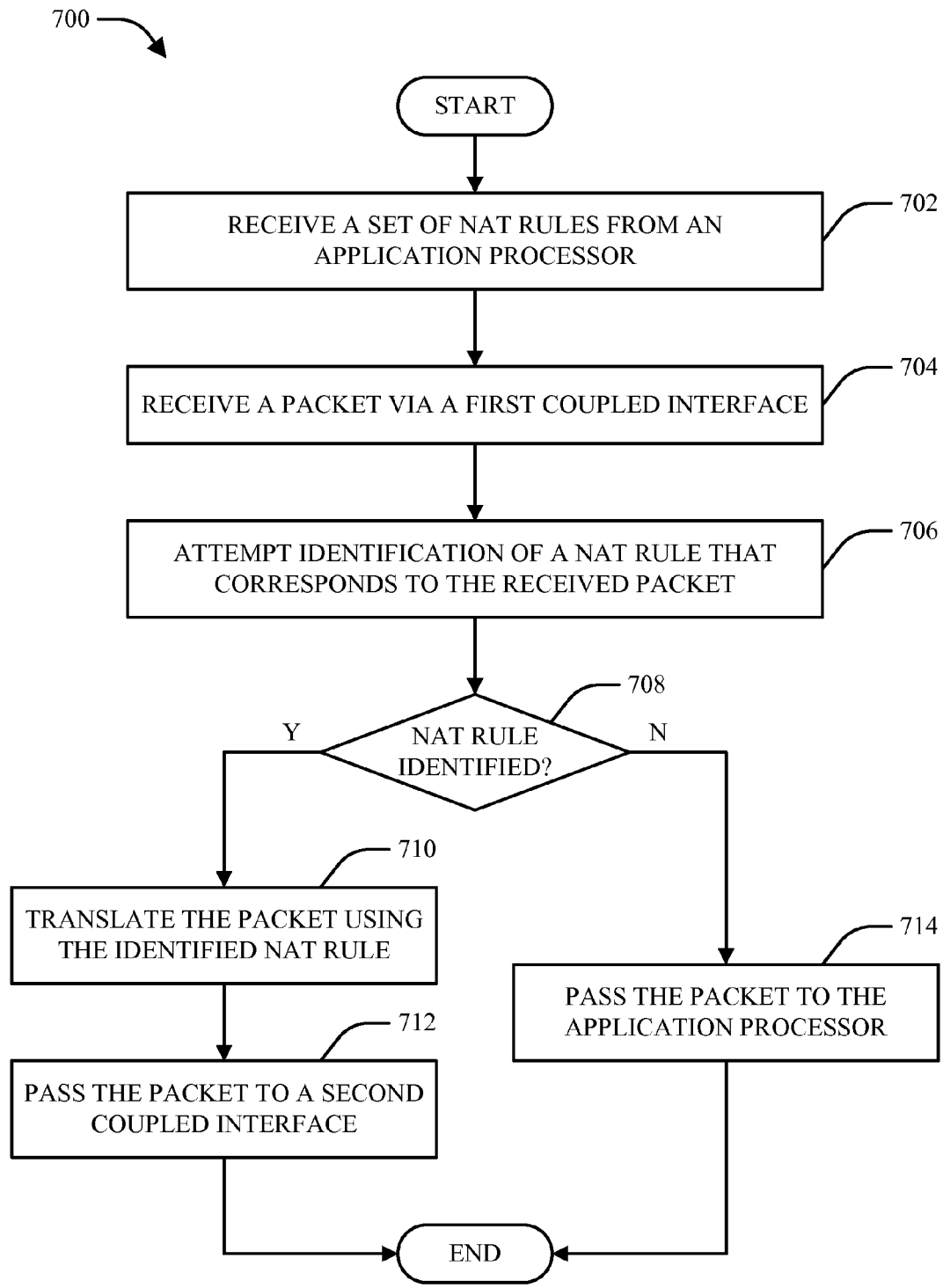
FIGS. 7-9 are flow diagrams of respective methodologies for managing data flows associated with a mobile computing device.
Figure 8:
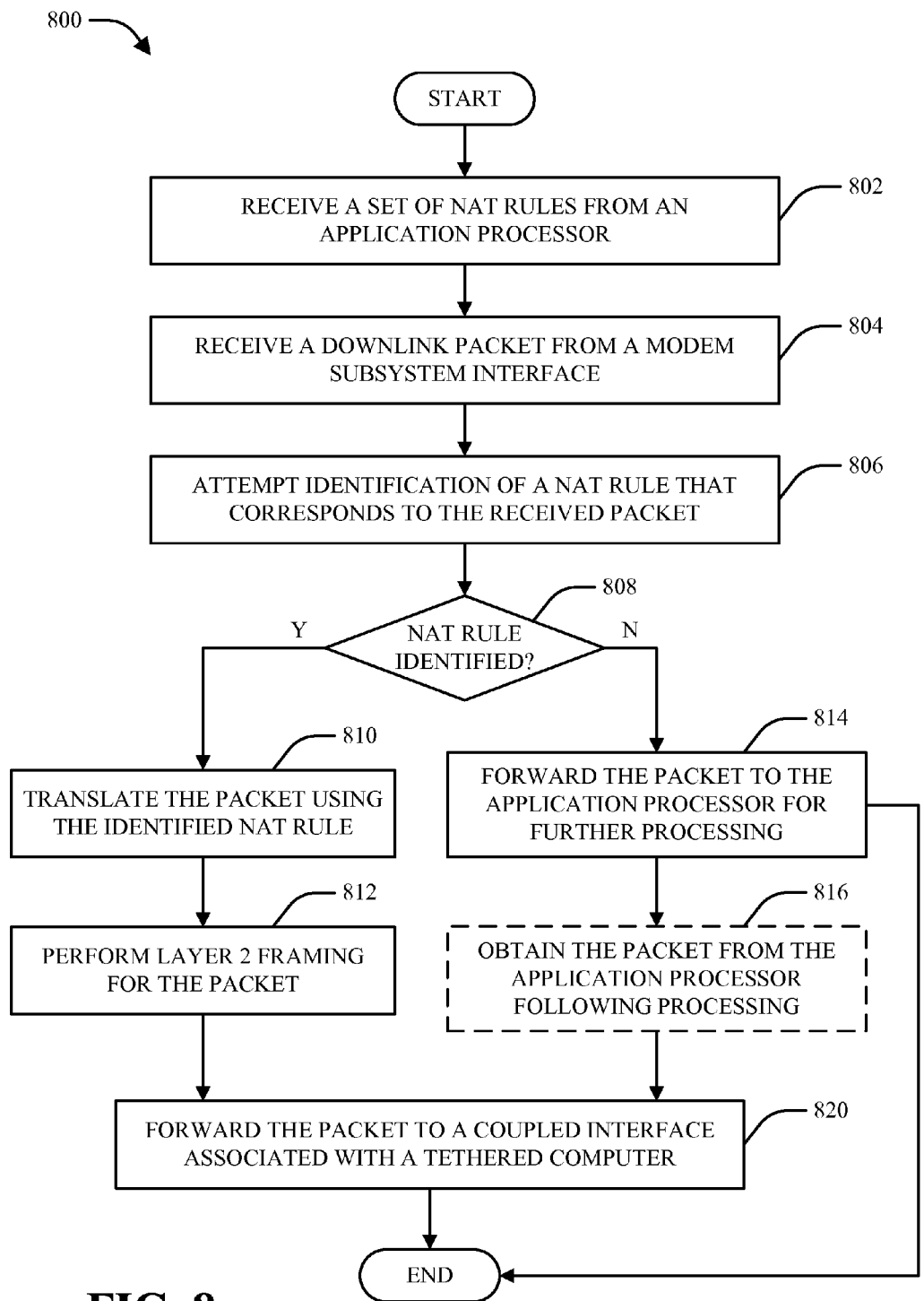
Figure 9:
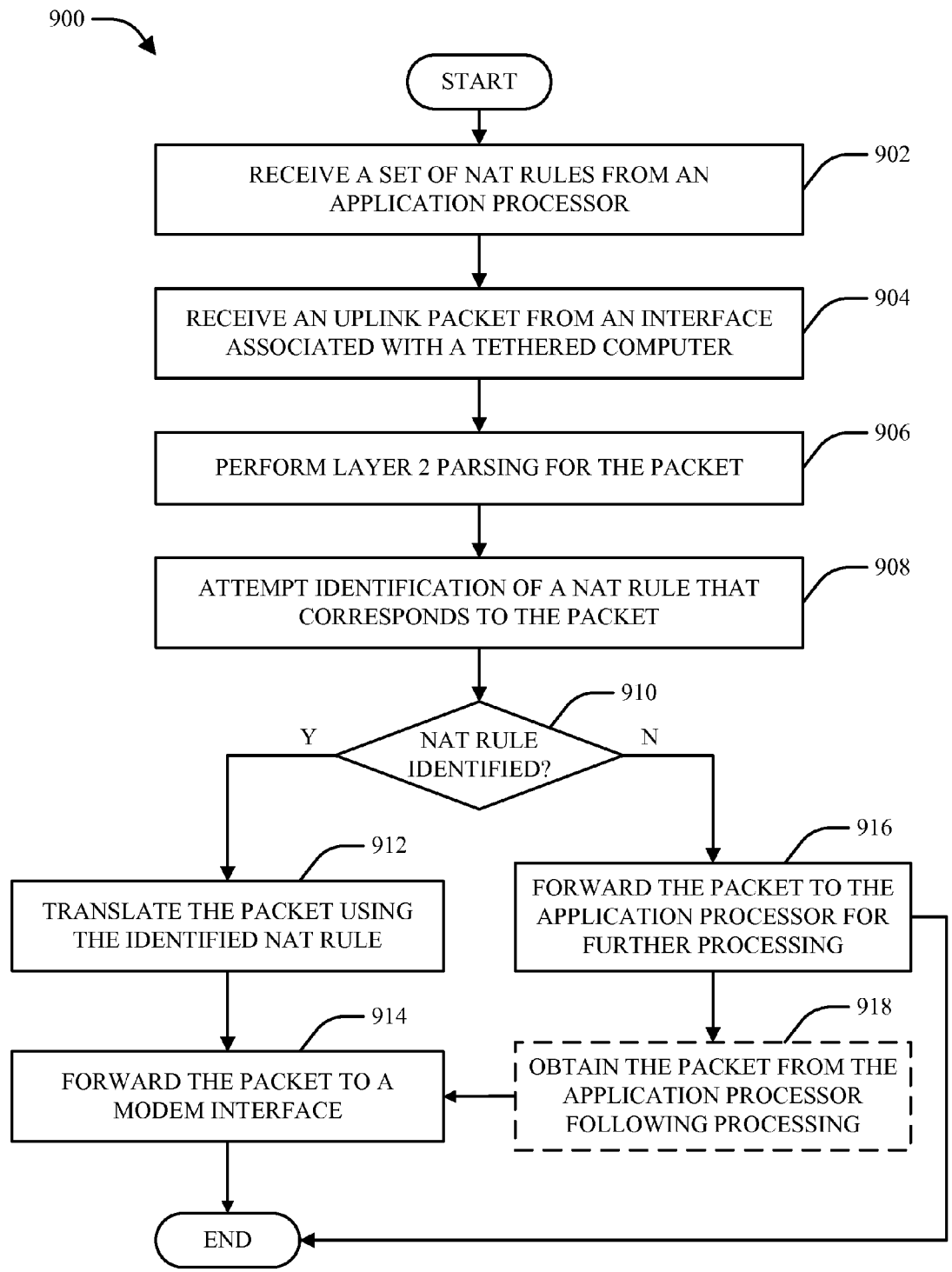

Referring now to FIGS. 7-9, methodologies that can be performed in accordance with various aspects set forth herein are illustrated. While, for purposes of simplicity of explanation, the methodologies are shown and described as a series of acts, it is to be understood and appreciated that the methodologies are not limited by the order of acts, as some acts can, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

With reference to FIG. 7, illustrated is a methodology 700 for managing data flows associated with a mobile computing device (e.g., mobile device 120). It is to be appreciated that methodology 700 can be performed by, for example, a mobile computing device and/or one or more hardware or software components associated therewith (e.g., peripheral module(s) 126) or any other appropriate computing device(s) or device component(s). Methodology 700 begins at block 702, wherein a set of NAT rules is received from an application processor (e.g., application processor 124). Next, at block 704, a packet is received via a first coupled interface (e.g., an interface to modem 123 or a PC interface to tethered computer 130). At block 706, identification of a NAT rule from the rules received at block 702 that corresponds to the packet received at block 704 can then be attempted.

At block 708, it is determined whether the attempted identification of a matching NAT rule at block 706 was successful. If identification was successful, methodology 700 can conclude by proceeding to block 710, wherein the packet received at block 704 is translated using the NAT rule successfully identified at block 706, and to block 712, wherein the packet is passed to a second coupled interface (e.g., a modem interface in the case of a packet originating from a tethered computer or vice versa). In contrast, if identification at block 706 was unsuccessful, methodology can instead conclude by proceeding from block 708 to block 714, wherein the packet received at block 704 is passed to the application processor.

FIG. 8 illustrates an example methodology 800 that can be utilized for managing downlink data associated with a mobile computing environment. Methodology 800 can be performed by, for example, a computing device (e.g., via one or more hardware components such as SPS 460 and its subcomponents) and/or any other suitable device. Methodology 800 begins at block 802, wherein a set of NAT rules is received from an application processor (e.g., application processor 310 via SPS driver 414). Next, at block 804, a downlink packet is received from a modem subsystem interface (e.g., a protocol processor 452 associated with modem 350). At block 806, identification of a NAT rule received at block 802 that corresponds to the packet received at block 804 is then attempted (e.g., by a decision block 462).

In accordance with one aspect, methodology 800 can branch at block 808 based on the result of the attempted identification at block 806. For example, if a NAT rule is successfully identified at block 806, methodology 800 can proceed from block 808 to block 810, wherein the packet received at block 802 is translated using the identified NAT rule (e.g., by a NAT block 464), and to block 812, wherein Layer 2 framing is performed for the packet (e.g., by a L2 Packet block 466). Methodology 800 can then conclude at block 818, wherein the packet is forwarded (e.g., by MUX 468) to a coupled interface (e.g., PC interface 340) associated with a tethered computer.

Alternatively, if a NAT rule is not successfully identified at block 806, methodology 800 can proceed from block 808 to block 814, wherein the packet received at block 802 is forwarded to the application processor for further processing. Methodology 800 can then conclude from block 814 or can optionally proceed to block 816, wherein the packet forwarded to the application processor at block 814 is received back from the application processor following processing. Upon completing the acts described at block 816, methodology 800 can then conclude at block 818 as described above.

Turning to FIG. 9, a methodology 900 for managing uplink data associated with a mobile computing environment is illustrated. It is to be appreciated that methodology 900 can be performed by any suitable computing device(s) and/or subcomponent(s) related to a computing device. Methodology 900 begins at block 902, wherein a set of NAT rules is received from an application processor. Next, at block 904, an uplink packet is received from a coupled interface associated with a tethered computer. Layer 2 parsing can then be performed at block 906 (e.g., by a L2 Parse block 472) for the packet received at block 904, and identification of a NAT rule received at block 902 that corresponds to the packet received at block 1404 can subsequently be attempted at block 908 (e.g. by a decision block 474).

As shown in FIG. 9, methodology 900 can branch at block 910 based on the result of the attempted identification at block 908. Thus, upon successful identification of a NAT rule at block 908, methodology 900 can proceed from block 910 to block 912, wherein the packet received at block 902 is translated using the identified NAT rule (e.g. by a NAT block 476). Methodology 900 can then conclude at block 914, wherein the packet is forwarded (e.g. by MUX 478) to a modem interface.

Alternatively, upon an unsuccessful attempt to identify a NAT rule at block 908, methodology 900 can proceed from block 910 to block 916, wherein the packet received at block 902 is forwarded to the application processor for further processing. Methodology 900 can conclude following the acts described at block 916 or can optionally proceed to block 918, wherein the packet is returned from the application processor following processing. After completion of the acts described in block 918, methodology 900 can then conclude at block 914 as described above.

Figure 10:
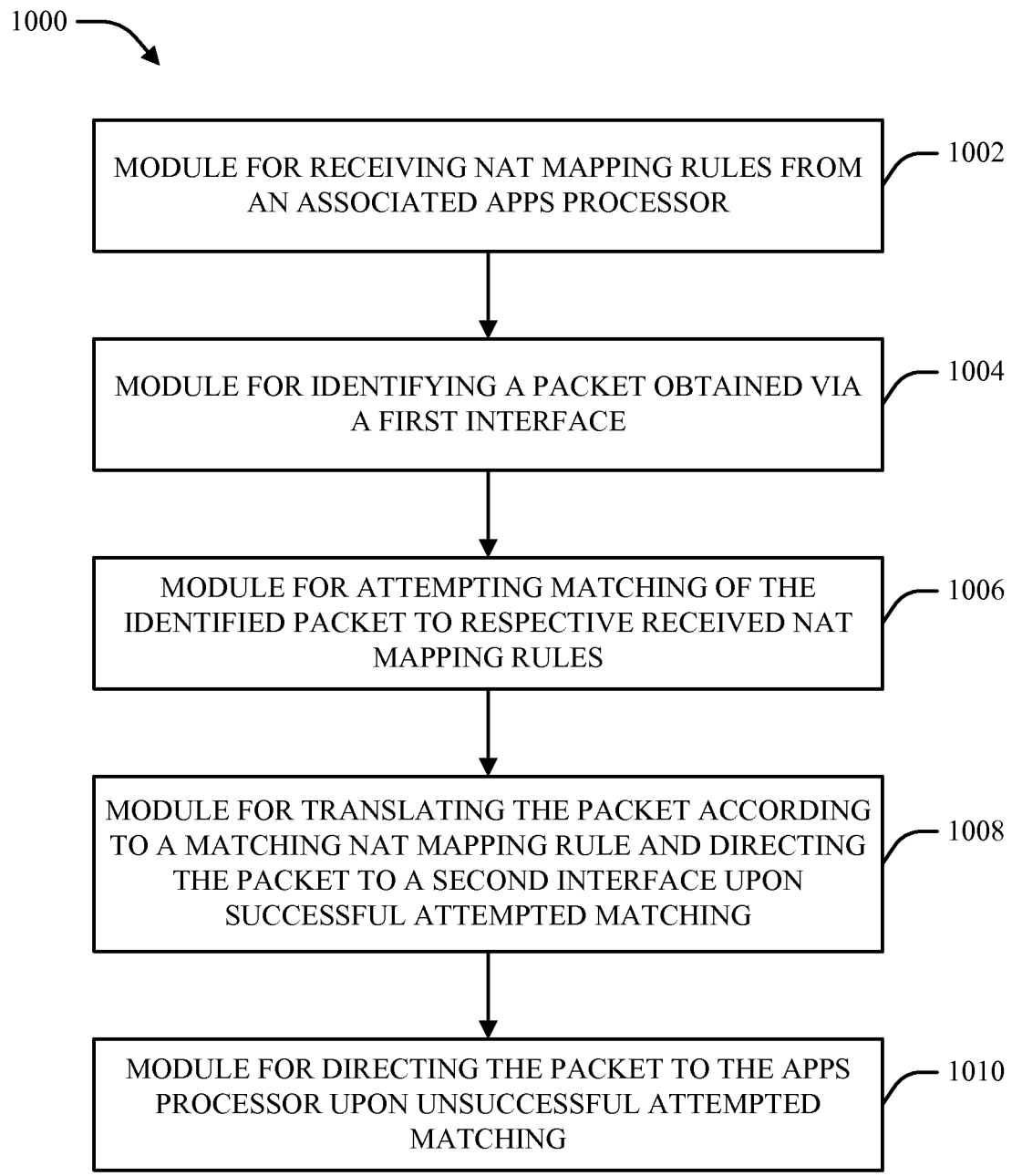
FIG. 10 is a block diagram of an apparatus that facilitates data service management for a network interface sharing application.

FIG. 10 illustrates an apparatus 1000 that facilitates data service management for a network interface sharing application. It is to be appreciated that apparatus 1000 is represented as including functional blocks, which can be functional blocks that represent functions implemented by a processor, software, or combination thereof (e.g., firmware). Apparatus 1000 can be implemented by any suitable computing device (e.g., mobile device 120) and/or component(s) thereof (e.g., peripheral module(s) 126) and can include a module 1002 for receiving NAT mapping rules from an associated apps processor, a module 1004 for identifying a packet obtained via a first interface, a module 1006 for attempting matching of the identified packet to respective received NAT mapping rules, a module 1008 for translating the packet according to a matching NAT mapping rule and directing the packet to a second interface upon successful attempted matching, and a module 1010 for directing the packet to the apps processor upon unsuccessful attempted matching.

Figure 11:
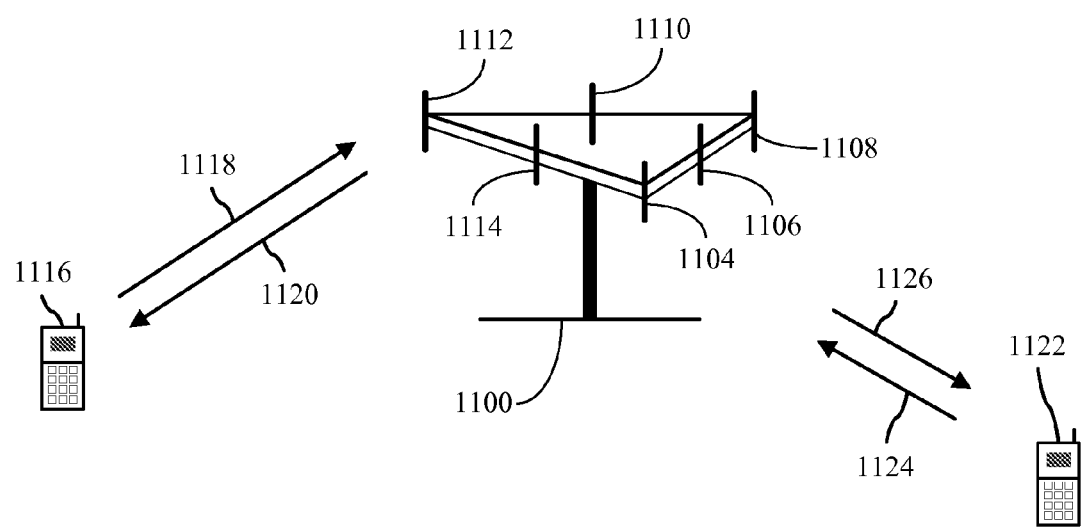
FIG. 11 illustrates an example wireless communication system in which various aspects described herein can function.

Referring now to FIG. 11, an illustration of a wireless multiple-access communication system is provided in accordance with various aspects. In one example, an access point 1100 (AP) includes multiple antenna groups. As illustrated in FIG. 11, one antenna group can include antennas 1104 and 1106, another can include antennas 1108 and 1110, and another can include antennas 1112 and 1114. While only two antennas are shown in FIG. 11 for each antenna group, it should be appreciated that more or fewer antennas may be utilized for each antenna group. In another example, an access terminal 1116 can be in communication with antennas 1112 and 1114, where antennas 1112 and 1114 transmit information to access terminal 1116 over forward link 1120 and receive information from access terminal 1116 over reverse link 1118. Additionally and/or alternatively, access terminal 1122 can be in communication with antennas 1106 and 1108, where antennas 1106 and 1108 transmit information to access terminal 1122 over forward link 1126 and receive information from access terminal 1122 over reverse link 1124. In a further example, access terminals 1116 and/or 1122 can be coupled to respective computing devices and can operate to provide connectivity between the coupled computing devices and access point 1100 or a core network or internetwork with which access point 1100 is associated via one or more data service sharing techniques as generally described herein. In a frequency division duplex system, communication links 1118, 1120, 1124 and 1126 can use different frequency for communication. For example, forward link 1120 may use a different frequency then that used by reverse link 1118.

Each group of antennas and/or the area in which they are designed to communicate can be referred to as a sector of the access point. In accordance with one aspect, antenna groups can be designed to communicate to access terminals in a sector of areas covered by access point 1100. In communication over forward links 1120 and 1126, the transmitting antennas of access point 1100 can utilize beamforming in order to improve the signal-to-noise ratio of forward links for the different access terminals 1111 and 1122. Also, an access point using beamforming to transmit to access terminals scattered randomly through its coverage causes less interference to access terminals in neighboring cells than an access point transmitting through a single antenna to all its access terminals.

An access point, e.g., access point 1100, can be a fixed station used for communicating with terminals and can also be referred to as a base station, an eNB, an access network, and/or other suitable terminology. In addition, an access terminal, e.g. an access terminal 1116 or 1122, can also be referred to as a mobile terminal, user equipment, a wireless communication device, a terminal, a wireless terminal, and/or other appropriate terminology.

Figure 12:
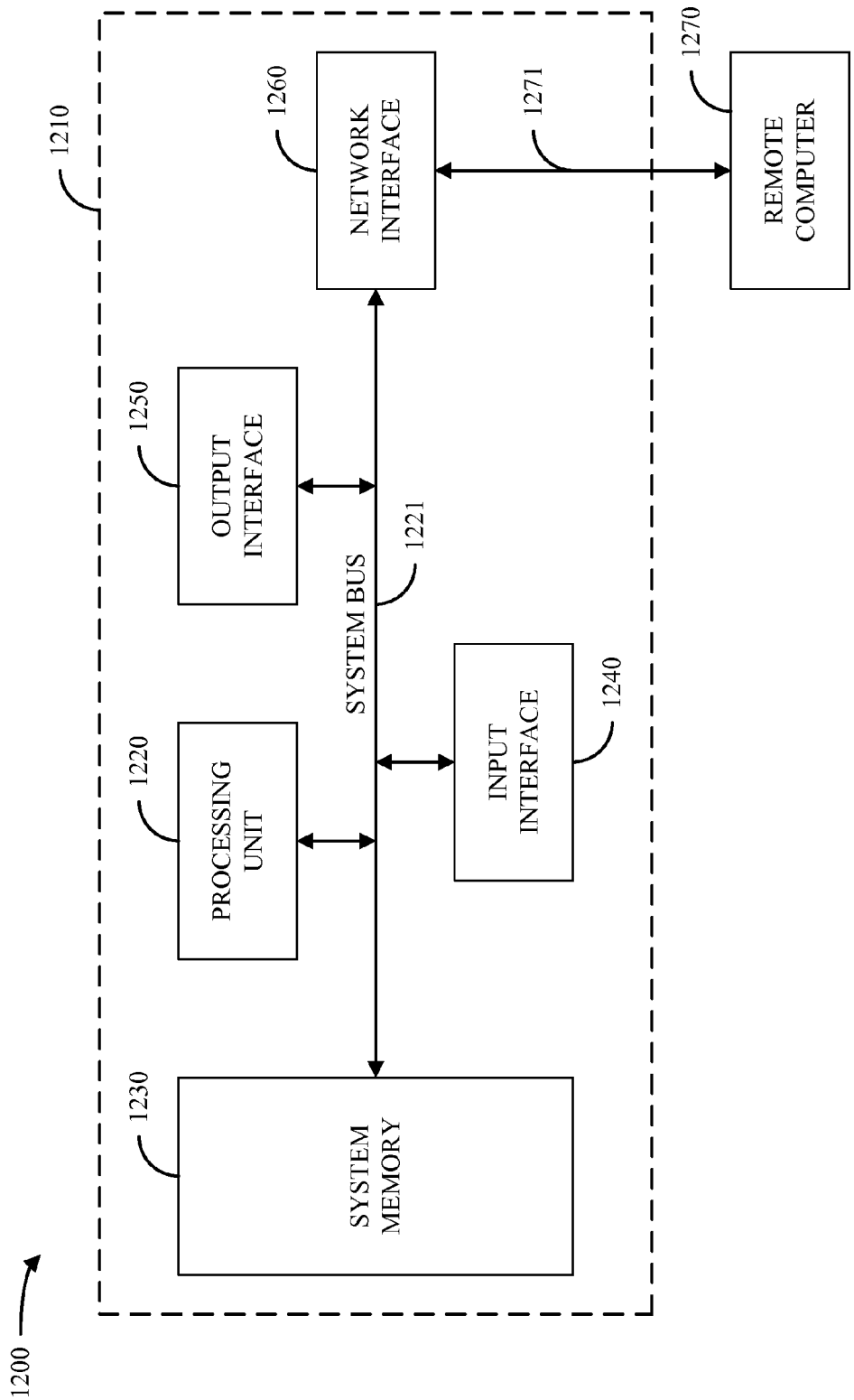
FIG. 12 is a block diagram of an example computing system that can be utilized to implement one or more aspects described herein.

Turning to FIG. 12, an example computing system or operating environment in which various aspects described herein can be implemented is illustrated. One of ordinary skill in the art can appreciate that handheld, portable and other computing devices and computing objects of all kinds are contemplated for use in connection with the claimed subject matter, e.g., anywhere that a network can be desirably configured. Accordingly, the below general purpose computing system described below in FIG. 12 is but one example of a computing system in which the claimed subject matter can be implemented.

As shown in FIG. 12, an example of a computing environment 1200 that can be utilized to implement various aspects described herein includes a general purpose computing device in the form of a computer 1210. Components of computer 1210 can include, but are not limited to, one or more processing units 1220, a system memory 1230, and a system bus 1221 that couples various system components including system memory 1230 to processing unit(s) 1220. System bus 1221 can be any of several types of bus structures, including a memory bus or memory controller, a peripheral bus, and a local bus using any of a variety of bus architectures.

In one example, system memory 1230 can be implemented using volatile and/or nonvolatile memory, such as read only memory (ROM) and/or random access memory (RAM). A basic input/output system (BIOS), containing the basic routines that help to transfer information between elements within computer 1210, such as during start-up, can be stored in memory 1230. Memory 1230 can also contain data and/or program modules that are immediately accessible to and/or presently being operated on by processing unit 1220. By way of non-limiting example, memory 1230 can also include an operating system, application programs, other program modules, and program data.

In addition, computer 1210 can include other computer storage media which can be removable or non-removable as well as volatile or nonvolatile. For example, computer 1210 can include a hard disk drive that reads from or writes to non-removable, nonvolatile magnetic media; a magnetic disk drive that reads from or writes to a removable, nonvolatile magnetic disk; an optical disk drive that reads from or writes to a removable, nonvolatile optical disk such as a CD-ROM or other optical media; or the like. Other computer storage media that could be used include magnetic tape cassettes, flash memory cards, digital versatile disks, digital video tape, solid state RAM, solid state ROM, and the like.

In a further example, a user can enter commands and information into the computer 1210 through input devices such as a keypad or keyboard; a pointing device such as a mouse, trackball, touch pad, touch screen, or the like; a microphone; a camera or optical sensor; and/or any other suitable input device. Input devices associated with computer 1210 can be connected to processing unit 1220 through input interface 1240. Input interface 1240 can be implemented in any suitable manner, such as a parallel port, a universal serial bus (USB) port, or the like. Additionally or alternatively, a monitor, display screen, speaker, and/or any other suitable output device can be connected to system bus 1221 via output interface 1250, which can in turn communicate with processing unit 1220, system memory 1230, and/or any other suitable components of computer 1210.

In accordance with one aspect, computer 1210 can operate in a networked environment using logical connections to one or more other remote computers, such as remote computer 1270. Remote computer 1270 can be a personal computer, a server, a router, a network PC, a peer device or other common network node, and/or any other remote media consumption or transmission device, and can include any or all of the elements described above relative to computer 1210. In one example, computer 1210 and remote computer 1270 can be coupled via a network or subnet 1271. Additionally, computer 1210 can facilitate connection to remote computer 1270 and/or a communication network or internetwork via a network adapter 1260. Accordingly, in the event that computer 1210 is associated with both a remote computer 1270 and the Internet, computer 1210 can utilize one or more techniques to enable remote computer 1270 to leverage its connection to the Internet as generally described above.

It is to be understood that the aspects described herein can be implemented by hardware, software, firmware, middleware, microcode, or any combination thereof. When the systems and/or methods are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

What has been described above includes examples of one or more aspects. It is, of course, not possible to describe every conceivable combination of components or methodologies for purposes of describing the aforementioned aspects, but one of ordinary skill in the art can recognize that many further combinations and permutations of various aspects are possible. Accordingly, the described aspects are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is meant to be a "non-exclusive or."

What is claimed is:

1. A method, comprising:
    receiving one or more Network Address Translation (NAT) rules from an application processor;
    obtaining a packet on a coupled interface;
    attempting identification of a NAT rule received from the application processor that corresponds to the obtained packet;
    upon a successful identification attempt, translating the obtained packet according to an identified NAT rule and forwarding the translated packet to one or more translated packet destinations; and
    upon an unsuccessful identification attempt, forwarding the obtained packet to the application processor.

2. The method of claim 1, wherein the method further comprises one or more of the following acts:
    processing the obtained packet according to a link layer protocol prior to attempted identification of a NAT rule; or
    processing the translated packet according to a link layer protocol prior to forwarding the translated packet to the one or more translated packet destinations.

3. The method of claim 2, wherein:
    the obtaining comprises obtaining a packet constructed using a link layer protocol on the coupled interface; and
    the processing the obtained packet comprises parsing the obtained packet to identify packet information corresponding to one or more of a network layer or a transport layer.

4. The method of claim 1, wherein the processing the translated packet comprises framing the translated packet according to a link layer protocol.

5. The method of claim 1, wherein the coupled interface comprises a protocol processor associated with a modem and the one or more translated packet destinations comprise a NAT-enabled tethered network connection interface enabled for use by an associated tethered computing device.

6. The method of claim 5, wherein the obtaining comprises:
identifying a public network to which the modem is connected; and
obtaining a packet at the modem from the identified public network.

7. The method of claim 6, wherein the obtaining further comprises obtaining the packet from the public network via the modem in a plurality of fragments.

8. The method of claim 7, further comprising forwarding respective obtained fragments to the application processor prior to attempting identification of a NAT rule.

9. The method of claim 7, further comprising reconstructing the obtained packet from its respective fragments prior to attempting identification of a NAT rule.

10. The method of claim 5, wherein:
the method further comprises identifying a public address and port specified in a header of the obtained packet; and
the attempting identification of a NAT rule comprises attempting to identify a NAT rule that specifies a transport protocol comprising one or more of User Datagram Protocol (UDP) or Transmission Control Protocol (TCP) and a private address and port corresponding to the identified public address and port.

11. The method of claim 10, wherein the translating comprises:
modifying the header of the obtained packet to specify the private address and port given by the identified NAT rule; and
updating a checksum in the header of the obtained packet to reflect the private address and port.

12. The method of claim 1, wherein the coupled interface is a network connection interface enabled for use by a tethered computing device and the one or more translated packet destinations comprise an interface associated with a modem.

13. The method of claim 12, wherein the obtaining comprises obtaining a packet from the tethered computing device via the network connection interface.

14. The method of claim 12, wherein:
the method further comprises identifying a private address and port specified in a header of the obtained packet; and
the attempting identification of a NAT rule comprises attempting to identify a NAT rule that specifies a public address and port corresponding to the identified private address and port according to a transport protocol comprising one or more of UDP or TCP.

15. The method of claim 14, wherein the applying an identified NAT rule comprises:
modifying the header of the obtained packet to specify the public address and port given by the identified NAT rule; and
updating a checksum in the header of the obtained packet to reflect the public address and port.

16. The method of claim 1, further comprising:
identifying a destination specified by the obtained packet at the coupled interface; and
forwarding the obtained packet from the coupled interface to the application processor prior to attempting identification of a NAT rule if the destination specified by the obtained packet is associated with the application processor.

17. The method of claim 1, further comprising:
upon the unsuccessful identification attempt, attempting to create a new NAT rule for the obtained packet.

18. The method of claim 1, wherein the method is performed by a user device.

19. The method of claim 1, wherein the application processor runs an operating system of a user device and/or applications running on the operating system of the user device.

20. A mobile computing apparatus, comprising:
a memory that stores data relating to one or more Network Address Translation (NAT) rules provided by an application processor; and
at least one processor coupled to the memory that is disparate from the application processor, the at least one processor configured to receive a packet on a coupled interface, to attempt identification of a NAT rule corresponding to the received packet, to translate the received packet according to an identified NAT rule and forward the translated packet to at least one translated packet destination upon successful identification of a NAT rule, and to forward the received packet to the application processor upon unsuccessful identification of a NAT rule.

21. The mobile computing apparatus of claim 20, wherein the at least one processor is further configured to perform at least one of processing the received packet according to an Open Systems Interconnection (OSI) Layer 2 (L2) protocol prior to attempting identification of a NAT rule or processing the translated packet according to a L2 protocol prior to forwarding the translated packet to the application processor.

22. The mobile computing apparatus of claim 21, wherein the at least one processor is further configured to receive a packet constructed using a L2 protocol on the coupled interface and to process the received packet at least in part by performing L2 de-framing for the received packet to facilitate operation on one or more of Layer 3 (L3) or Layer 4 (L4) information contained within the received packet.

23. The mobile computing apparatus of claim 21, wherein the at least one processor is further configured to process the translated packet at least in part by framing the translated packet according to a L2 protocol.

24. The mobile computing apparatus of claim 20, wherein the coupled interface is a protocol processor interface associated with a modem and the at least one translated packet destination comprises a network connection interface associated with a tethering link enabled for use by an associated tethered computing device.

25. The mobile computing apparatus of claim 24, wherein the at least one processor is further configured to identify a public address and port specified in a header of the received packet and to attempt identification of a NAT rule at least in part by attempting to identify a NAT rule that specifies a transport protocol comprising one or more of User Datagram Protocol (UDP) or Transmission Control Protocol (TCP) and a private address and port corresponding to the identified public address and port.

26. The mobile computing apparatus of claim 25, wherein the at least one processor is further configured to apply an identified NAT rule at least in part by modifying the header of the received packet to specify the identified private address and port given by the identified NAT rule and updating a checksum in the header of the received packet to reflect the private address and port.

27. The mobile computing apparatus of claim 20, wherein the coupled interface is a network connection interface associated with a tethered computing device and the at least one translated packet destination comprises an interface associated with a modem.

28. The mobile computing apparatus of claim 27, wherein the at least one processor is further configured to receive a packet from the tethered computing device via the network connection interface.

29. The mobile computing apparatus of claim 27, wherein the at least one processor is further configured to identify a private address and port specified in a header of the received packet and to attempt identification of a NAT rule at least in part by attempting to identify a NAT rule that specifies a public address and port corresponding to the identified private address and port according to a transport protocol comprising one or more of UDP or TCP.

30. The mobile computing apparatus of claim 29, wherein the at least one processor is further configured to apply an identified NAT rule at least in part by modifying the header of the received packet to specify the identified public address and port given by the identified NAT rule and updating a checksum in the header of the received packet to reflect the public address and port.

31. The mobile computing apparatus of claim 27, wherein the at least one processor is further configured to identify a terminating point of the received packet and to forward the received packet from the coupled interface to the application processor prior to attempting identification of a NAT rule if the terminating point of the received packet is associated with the application processor.

32. An apparatus, comprising:
means for receiving respective Network Address Translation (NAT) mapping rules from an associated application processor;
means for identifying a packet obtained via an interface;
means for attempting matching of the identified packet to a received NAT mapping rule;
means for translating the identified packet according to a matching NAT mapping rule upon successful attempted matching;
means for directing the translated packet to one or more translated packet destinations upon application of the matching NAT mapping rule; and
means for directing the identified packet to the application processor upon unsuccessful attempted matching.

33. The apparatus of claim 32, further comprising means for performing link layer processing for the identified packet prior to operation of the means for attempting matching.

34. The apparatus of claim 32, further comprising means for performing link layer processing for the translated packet prior to operation of the means for directing the translated packet to the one or more translated packet destinations.

35. The apparatus of claim 32, wherein the interface is associated with a modem and at least one translated packet destination is associated with a tethered computing device.

36. The apparatus of claim 35, wherein the means for identifying comprises:
means for identifying a public network to which the modem is connected; and
means for identifying a packet received by the modem over the identified public network.

37. The apparatus of claim 35, wherein:
the apparatus further comprises means for identifying a public address and port specified in a header of the identified packet; and
the means for attempting matching comprises means for attempting identification of a NAT mapping rule that specifies a transport protocol comprising one or more of User Datagram Protocol (UDP) or Transmission Control Protocol (TCP) and a private address and port corresponding to the identified public address and port.

38. The apparatus of claim 37, wherein the means for translating comprises:
means for modifying the header of the identified packet such that the header specifies the private address and port given by the identified NAT mapping rule; and
means for modifying a checksum in the header of the identified packet based on the private address and port given by the identified NAT mapping rule.

39. The apparatus of claim 32, wherein the interface is associated with a tethered computing device and at least one translated packet destination is associated with a modem.

40. The apparatus of claim 39, wherein the means for identifying comprises means for identifying a packet communicated by the tethered computing device.

41. The apparatus of claim 39, wherein:
the apparatus further comprises means for identifying a private address and port specified in a header of the identified packet; and
the means for attempting matching comprises means for attempting identification of a NAT mapping rule that specifies a public address and port corresponding to the identified private address and port according to a transport protocol comprising one or more of UDP or TCP.

42. The apparatus of claim 41, wherein the means for translating comprises:
means for modifying the header of the identified packet such that the header specifies the public address and port given by the identified NAT mapping rule; and
means for modifying a checksum in the header of the identified packet based on the public address and port given by the identified NAT mapping rule.

43. An integrated circuit that executes machine-executable instructions, the instructions comprising:
receiving respective Network Address Translation (NAT) mapping rules from an associated application processor;
identifying a packet obtained via an interface;
attempting matching of the identified packet to respective NAT mapping rules;
translating the identified packet according to a matching NAT mapping rule upon successful attempted matching;
directing the translated packet to one or more translated packet destinations upon application of a matching NAT mapping rule; and
directing the identified packet to the application processor upon unsuccessful attempted matching.

44. The integrated circuit of claim 43, wherein the instructions further comprise performing Open Systems Interconnection (OSI) Layer 2 (L2) processing for the identified packet prior to attempting matching of the identified packet to respective NAT mapping rules.

45. The integrated circuit of claim 43, wherein the instructions further comprise performing L2 processing for the translated packet prior to directing the translated packet to the one or more translated packet destinations.

46. The integrated circuit of claim 43, wherein the interface is associated with a modem and at least one translated packet destination is associated with a tethered computing device.

47. The integrated circuit of claim 43, wherein:
the instructions further comprise identifying a public address and port specified in a header of the identified packet; and the attempting matching comprises attempting identification of a NAT mapping rule that specifies a transport protocol comprising one or more of User Datagram Protocol (UDP) or Transmission Control Protocol (TCP) and a private address and port corresponding to the identified public address and port.

48. The integrated circuit of claim 47, wherein the translating comprises:
   modifying the header of the identified packet such that the header specifies the private address or port given by the identified NAT mapping rule; and
   modifying a checksum in the header of the identified packet based on the private address and port given by the identified NAT mapping rule.

49. The integrated circuit of claim 43, wherein the interface is associated with a tethered computing device and at least one translated packet destination is associated with a modem.

50. The integrated circuit of claim 49, wherein:
   the instructions further comprise identifying a private address and port specified in a header of the identified packet; and
   the attempting matching comprises attempting identification of a NAT mapping rule that specifies a public address and port corresponding to the identified private address and port according to a transport protocol comprising one or more of UDP or TCP.

51. The integrated circuit of claim 50, wherein the translating comprises:
   modifying the header of the identified packet such that the header specifies the public address and port given by the identified NAT mapping rule; and
   modifying a checksum in the header of the identified packet based on the public address and port given by the identified NAT mapping rule.

* * * * *